May 4, 1965
H. B. JOPSON ET AL
3,181,893
UNIVERSAL TOW BAR
Filed Sept. 27, 1962
2 Sheets-Sheet 1
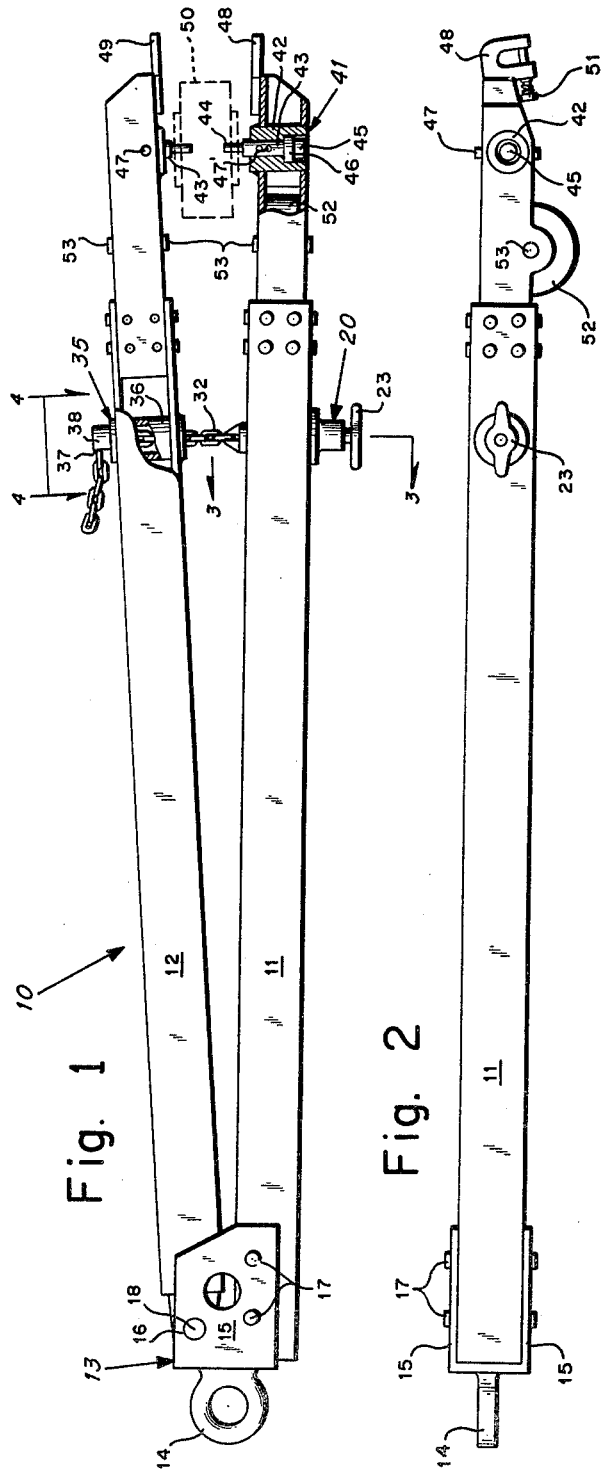
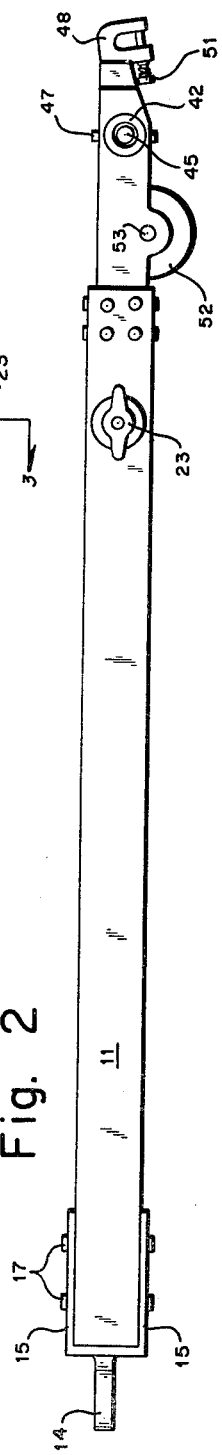
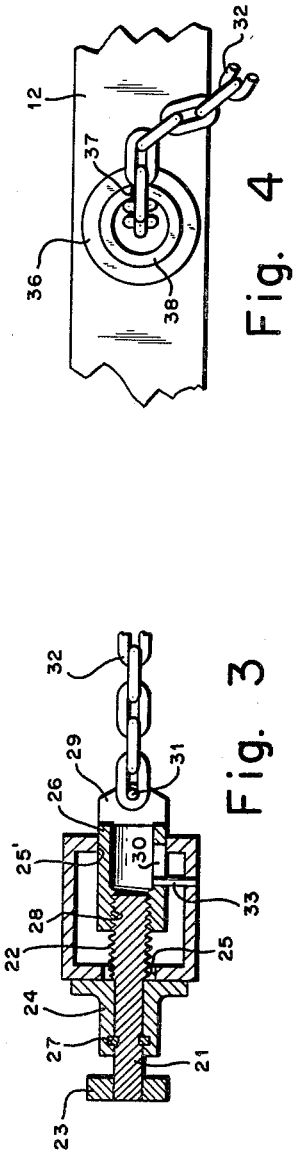
INVENTORS
HOWARD B. JOPSON
HAROLD V. YENTZER
PAUL KARNOW
BY
AGENT

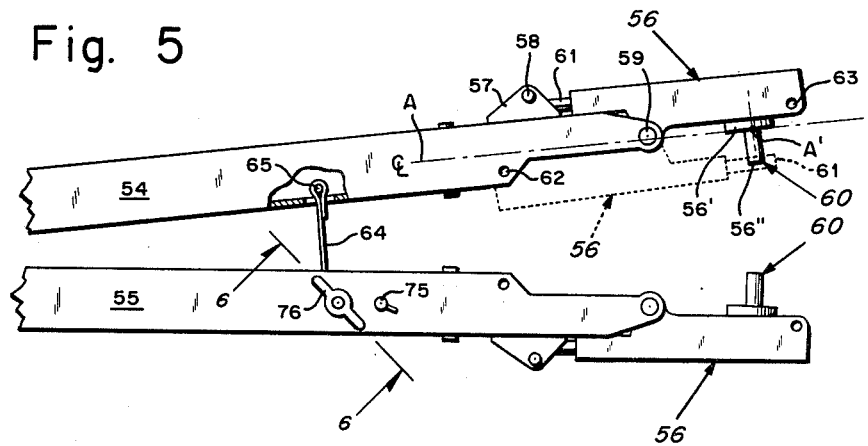
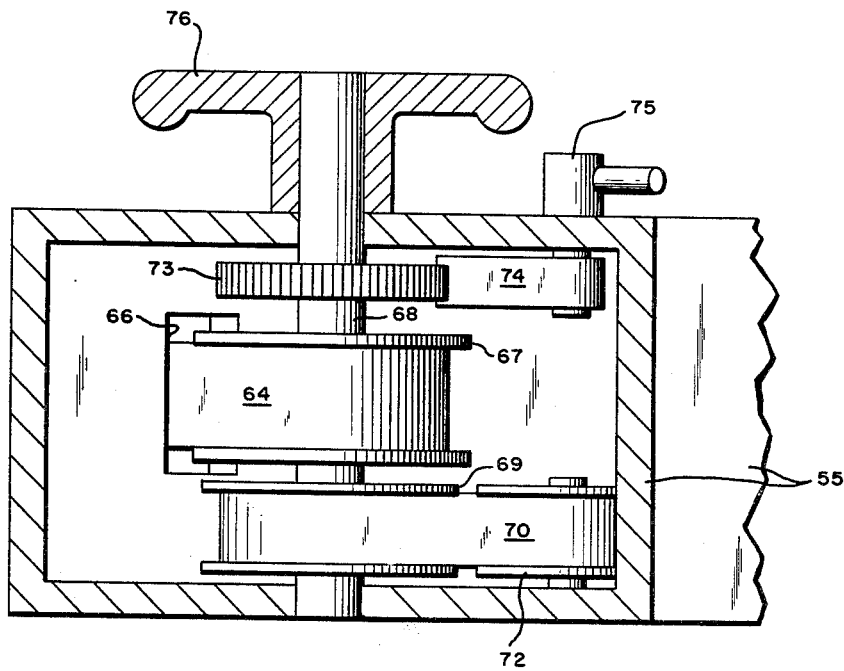

United States Patent Office 3,181,893
Patented May 4, 1965

3,181,893
UNIVERSAL TOW BAR
Howard B. Jopson, Warrington, Harold V. Yentzer, Huntingdon Valley, and Paul Karnow, Glenside, Pa., assignors to the United States of America as represented by the Secretary of the Navy
Filed Sept. 27, 1962, Ser. No. 227,666
2 Claims. (Cl. 280—494)
(Granted under Title 35, U.S. Code (1952), sec. 266)

The invention described herein may be manufactured and used by or for the Government of the United States of America for governmental purposes without the payment of any royalties thereon or therefor.

The present invention relates to towing apparatus for aircraft and the like, and more particularly to towing apparatus of the universal type for use with the various towing connections provided on diverse types of aircraft.

Towing apparatus, commonly referred to as tow bars, are employed aboard aircraft carriers for towing various types of aircraft to and from a storage area. Due to the unusual conditions which exist in an aircraft carrier operation, speed in moving the landed craft about the landing area is of extreme importance. This requirement of dispatch is impeded because of the various types of aircraft that are based on an aircraft carrier and because these aircraft have different connections for attachment to a tow bar. Some aircraft are provided with a ring or rings on the fuselage or landing gear for the reception of a tow-bar hook portion; others are towed at their front-wheel axle which could alternatively be constructed with a hollow fitting or an extended solid lug. Under conditions commonly present on aircraft carriers, a different type of tow bar is used for each type of aircraft tow connection provision. Because of this use of multiple-type tow bars, expeditious moving of the landed craft about the landing area is precluded since the operator must first determine the type of tow bar connection provided on the landed aircraft and then proceed to a specified storage area to select the apropriate tow bar. Additionally, it is obviously seen that the increase in number of tow bars results in increased cost.

The tow bars of the prior art have also been found to be unsafe. These tow bars inherently include projecting portions thereon which frequently obstruct and injure persons or objects which come in contact therewith when the bar is being used. In addition, due to the extreme forces exerted on the bar by the pulling power, particularly lateral forces, exerted at the tow-ring end and the drag provided by the weight of the aircraft at the other end, disengagement of the bar from the aircraft connector element is prevalent. This deleterious condition causes serious personal injury and high property losses.

Accordingly, it is an object of the present invention to provide a unitary towing apparatus which is of light weight, easily and positively coupled to various connections as provided on dissimilar aircraft, one which has no dangerous projecting elements thereon, and one which would be efficient and safe for use by personnel on aircraft carrier decks.

A further object of the invention is to provide a tightening arrangement for the towing apparatus which can be quickly and positively operated, which requires little or no skill in the operation thereof and which will provide positive locking in a coupled position thereby eliminating disengagement of the towing apparatus from the aircraft.

Various other objects and advantages will appear from the following description of several embodiments of the invention and the most novel features will be particularly pointed out hereinafter in connection with the appended claims.

In the accompanying drawing:
FIG. 1 illustrates a top view of one embodiment of a towing apparatus of the present invention with sections cut away to show a chain fastening means and a stepped-pin housing arrangement;
FIG. 2 is a side view of the towing apparatus of FIG. 1;
FIG. 3 is a view taken along section 3—3 in FIG. 1 and illustrates one portion of the chain fastening arrangement in greater detail;
FIG. 4 is a view taken along section 4—4 in FIG. 1 and illustrates another portion of the chain fastening structure;
FIG. 5 illustrates the aircraft connection end of another embodiment of the towing apparatus;
FIG. 6 is a view taken along section 6—6 of FIG. 5 and illustrates a strap take-up arrangement in greater detail.

The embodiment of the invention in FIGS. 1 to 4 illustrates a tow bar indicated generally at 10 having legs 11 and 12 joined at one end thereof by a clevis member 13.

The bight portion of the clevis member 13 has connected thereto a tow ring 14 for engagement with a towing vehicle. The sides 15 of the clevis member 13 are provided with aligned apertures 16 for receiving coupling pin 18 for pivotally coupling leg 12 and the clevis member. Leg 11 is connected to the clevis member 13 through pin 17 and is in fixed relation therewith.

As shown in FIG. 3, legs 11 and 12 are constructed in rectangular, hollow cross section but it is contemplated that the legs 11 and 12 be of any appropriate cross section.

Intermediate of the length of the bar 10 is a tightening mechanism generally indicated by 20 for drawing the connecting ends of the tow bar into engagement with mating aircraft fittings such as the hollow axle of a nose wheel 50, shown in dotted lines. Although the illustrated embodiment indicates the ends of the tow bar engaging a single nose wheel, it is within the contemplation of this invention that the legs of the bar may be separated and then attached to a dual-wheel arrangement. The tightening mechanism is illustrated in FIGS. 1 and 3 and comprises a rotatable shaft 21 having one end thereof externally threaded as at 22, and at the other end thereof having an external handle 23 for rotating the shaft. The shaft 21 passes through an opening in boss 24 and through an aperture 25 in the hollow leg 11; the boss being fixedly secured to the side of the leg. An internally threaded sleeve member 26 extends into the hollow leg member 11 through an aperture 25' provided in the sidewall thereof and threadably engages the threaded end 22 of shaft 21.

In order to preclude shaft 21 from moving longitudinally a locking ring 27 is interposed within a slot in the boss and engages a contiguous slot formed on the periphery of the shaft 24. In order to preclude sleeve member 26 from rotating but permitting the same to move longitudinally, an elongated opening 30 is formed in the sleeve and is engaged by fixed retaining pin 33 which extends from its anchored position in the bottom wall of the leg to the opening. The end of the sleeve remote from the internally threaded portion 28 is constructed with a chain connecting portion 29 having a dowel 31 fixedly secured thereon for engagement with a link of chain 32. As can be readily seen by this arrangement, the rotation of the shaft 21 within its housing will cause the sleeve 26 to be drawn inwardly thereby providing a fine adjustment of the tightening mechanism.

Intermediate the ends of leg 12 is provided a chain housing generally indicated at 35 which comprises a tubular member 36 having the free end of flexible chain 32 passing therethrough and being fastened in a particular locked position by engagement of a link thereof in the slot 37 provided in an external tubular member 38. The member 38 has the end opposite the dotted end fixedly secured by welding or the like to the tubular member 36. The engagement of the link in the slot 37 of the external member 38 provides the rough adjustment of the bar in the closed position. In order that the free end of the chain be precluded from swinging and thereby causing injury, it is contemplated that a dowel pin be connected to the end link for insertion in any one of a series of holes which may be formed in the leg 12 along the length thereof.

Adjacent the end of tow bar 10 is housed a stepped-pin arrangement generally noted as 41 and which comprises on each leg 11 and 12 a socket 42 having releasably coupled therein a stepped pin 43. Stepped pin 43 has three diameters; a small diameter 44 which is shown in FIG. 1 as engaging the hollow axle of the nose wheel 50 of an aircraft shown in dotted lines, an intermediate diameter 45 for engaging hollow axles of intermediate size, and a large diameter 46 for engaging hollow axles having a larger diameter. Pins 43 can be removed by retracting locking bolt 47 from hole 47' in the pins 43, removing the pins, and replacing the same with the larger diameters extending toward each other. Socket 42, when not acting as a housing for the pin 43, can be utilized for engaging lug-type wheel axles of a diameter sufficiently small enough to be engaged by the socket member 42. This function is performed by completely removing the pin 43 and utilizing the bar without the same.

At the extremity of the legs 11 and 12 are hook members 48 and 49 which are employed to couple the tow bar to a ring or rings provided on the aircraft to be towed. Each hook member contains thereon a spring-biased pin 51 for maintaining the ring within the hook portion. This spring-biased pin 51 is held in position and operated in the conventional manner and further description is not considered necessary.

Additionally, it should be noted that in FIG. 2 a wheel 52 is provided having the axles 53 thereof engaging the sides of the hollow legs 11 and 12 in order to obtain mobility of the tow bar 10.

The operation of the bar of FIGURES 1–4 is as follows: First, a determination is made of the type of connection on the landed aircraft. If the landing wheel is constructed with a hollow axle, the proper pin diameter is selected and positioned within the socket 42. The pins are manually brought into engagement with the hollow axle and the free end of the chain 32 is positioned so that a link thereof engages the slot 37 in the external tubular member 38. The handle 23 is then rotated to additionally draw the bars together whereby a tight engagement and positive locking is obtained. If it is determined that the landed aircraft has a lug-type wheel axle, then the pins 43 are withdrawn from their housing and the sockets formed thereby are brought into engagement with the lug axle; the tightening is performed in the same manner as indicated above. Lastly, if a single fuselage ring is to be used for the tow-bar connection, the pins are removed, the legs 11 and 12 may be drawn together and tightened and then the hooks 48–49 are latched about the fuselage ring or if two rings are provided, the legs are separated and the hook-ends are individually connected to the rings.

Another embodiment of the invention is shown in FIGS. 5 and 6. This embodiment illustrates legs 54 and 55 having at the one end thereof a pivotal section indicated generally at 56. Since pivotal sections 56 are identical, only one such section will be described. At the end of pivotable leg 54 is connected a bracket 57 having a quick-release pin 58 for retaining the pivotal section 56 in the pin-operative position. Section 56 is pivotally connected to the bar 54 by pivot pin 59. At the one end of the pivotal section 56 is housed a stepped-pin arrangement indicated generally at 60 and which is identical to that shown in the embodiment of FIGS. 1 to 4, inclusive, and for the description thereof reference is made to such figures and appropriate prior discussion. It should again be noted that the stepped pin can be removed from its housing and the socket can then be utilized as a collar for engaging a lug that may exist on the axle of an aircraft nose wheel.

When it is desired to use the hook 61 for engaging a fuselage ring, the quick-release pin 58 is disengaged from the bracket 57 and the pivotal section 56 is pivoted about pivot pin 59. The quick release pin is then inserted within the aperture 62 of leg 54 and through aperture 63 in the pivotal section to lock the pivotal section 56 in the hook-operative position. Hook member 61 is constructed in a conventional manner and further discussion thereof is not deemed necessary. Of particular significance is that the longitudinal center-line A of the leg 54 extends through the point A' where the pin engages or intersects the socket member formed within the pivotal section 56. It is by means of this structural arrangement that any eccentric load will be precluded and a direct axial force is exerted through the tow bar legs 54 and 55.

It should further be noted that upon pivoting of the pivotal section 56 from the position shown in FIG. 5 to the dotted line position of FIG. 5 the bars may be drawn together to have the hook portions contiguous to each other and are then in position for operation upon a single fuselage ring.

FIGS. 5 and 6 further illustrate an additional embodiment of the tightening mechanism for drawing the legs 54 and 55 of the tow bar together thereby causing the pin 56" to engage the hollow axles of the front wheel of an aircraft or alternatively drawing the sockets 56' void of the pins, about lugs which may be provided on the front-wheel axles of an aircraft. In the tightening mechanism illustrated in FIGS. 5 and 6, the looped end of a strap 64 engages and is held in position within leg 54 by means of a quick-release pin 65. Strap 64 at the end opposite the quick-release pin 65 passes through an aperture 66 provided within the side of leg 55 and is wound about the spool 67. This spool 67 is rigidly fastened to rotatable shaft 68 which is journaled within the top and bottom portions of the hollow leg 55. Splined on the shaft 68 is a power drum 69 which has coiled thereabout one end of a substantially constant-force spiral spring such as a Negator spring 70. This type of spring has a pre-formed arched configuration transverse to the length of the spring which provides the substantially constant-force winding characteristics. The other end of the spring 70 is wound about a take-up drum 72 which is also journaled within the bar 55 in any conventional manner. The bias of spring 70 urges the spool 67 to rotate in a direction to cause the strap 64 to wind about the spool 67 and to thereby draw the ends of legs 54 and 55 together. To preclude separation of the ends of the legs 54 and 55 a sprocket or ratchet wheel 73 is fixedly attached to the shaft 68 and is engageable by a pawl 74 which is provided on the top of the leg 55. This pawl 74 is spring urged (not shown) into engagement with the teeth of the wheel 73 and by means of a handle 75 can be released from engagement therewith to enable paying out of the strap 64 and winding of spring 70. In order to provide an additional tightening force, a handle 76 is provided and is integrally connected with the shaft 68. It should be noted that the pawl 74 is constructed in the conventional manner as to allow the sprocket or ratchet wheel to be turned in the direction which would draw the strap 64 about the spool 67 but is so arranged as to preclude any reverse turning thereof until the pawl is manually released.

In the operation of this tightening mechanism the legs 54 and 55 are manually pulled together to draw the pin 56" into engagement with the hollow axle of the landing gear thereby causing slack in the strap 64. The action of the spring 70 is such as to rotate the spool 67 which thereby draws up the slack caused in strap 64. The additional final tightening is then provided by the turning of handle 76 for further drawing strap 64 about the spool 67. The pawl engaging the teeth of the wheel 73 precludes shaft 68 and spool 67 from rotating in the opposite direction thereby precluding the legs 54 and 55 from being separated.

In the embodiment of FIGS. 5 and 6 the operation is as follows: First, a determination is made of the type of connection on the aircraft to be towed. If the landing wheel has a hollow axle, the proper pin diameter is selected and the pins manually inserted within the hollow axle of the landing gear by manually bringing together the legs of the tow bar. The slack within the strap 64 is automatically taken up by the action of the spring 70 upon the drum 69, shaft 68 and spool 67. The locking function occurs by reason of the engagement of pawl 74 and the teeth on the wheel 73. A further tightening is accomplished by the rotation of handle 76 and shaft 68, whereby the spool 67 is rotated to wind strap 64 about the spool. If it is determined that the landing gear is provided with a lug-type wheel axle, the stepped-pin 56'' of pivotal section 56 is removed and the socket 56' is utilized for engagement with the lug of the landing-wheel axle. If it is determined that the aircraft to be towed is provided with fuselage rings, the quick release pin 58 is removed and the hook 61, which is an integral part of the pivotal section 56, is permitted to pivot about pin 59; quick release pin 58 then being inserted within the aligned apertures 62 and 63. The hook is then actuated to engage the fuselage rings provided on aircraft to be towed.

It will be understood that there are changes in the details, materials, steps and arrangements of parts which have been herein described and illustrated in order to explain the nature of the invention, may be made by those skilled in the art within the principle and scope of the invention expressed in the appended claims.

What is claimed is:

1. A towing apparatus for devices having various types of tow fastenings comprising:

a pair of rigid legs pivotally joined at one end of each for articulation therebetween, attachment means fixed to said junction for coupling a towing vehicle thereto, a shaft rotatably mounted on one of said legs, a spool coaxially secured to said shaft, spring means operatively connected between said leg and said spool for rotating said shaft and said coaxial spool, strap means having one end thereof wound about said spool and having the other end connected to the other leg, and selective fitting means pivotally connected to the other end of said legs for engaging a particular type of connection provided on the devices.

2. A towing apparatus for aircraft having various types of tow fastenings comprising:

a pair of rigid rectangular, tubular legs of substantially equal length, a clevis fixed to one end of one of said legs and pivotally joined to one end of the other of said legs, attachment means on said clevis for coupling a towing vehicle thereto, a shaft rotatably mounted on said one leg and extending transversely to the longitudinal axis thereof, means at one end of said shaft for manually rotating the same, a pawl member rotatably secured to said one leg, a sprocket wheel fixed to said shaft and having teeth thereon for engagement with said pawl, a spool coaxial with and fixedly secured to said shaft, a drum coaxial with and fixedly secured to said shaft, a second drum rotatably journaled within said one leg adjacent said first drum, spring means connected between said first and second drums for rotating said drums and said attached shaft, strap means having one end wound about said spool and having the free end thereof releasably secured to said other leg, a terminal section pivotally connected intermediate its ends to the end of each of the legs opposite the clevis, each section having a hook means at one end thereof for connection to the appropriate aircraft fastening and having oppositely facing cylindrical sockets at the other end thereof, and pin means adapted to be journaled within each socket for connection to the aircraft tow fastening, said terminal section being pivotal between a hook-use and pin-use position.

References Cited by the Examiner

UNITED STATES PATENTS

| | | | |
|---|---|---|---|
| 1,566,740 | 12/25 | Forrest | 242—107.4 X |
| 2,287,955 | 6/42 | Zunino | 280—502 X |
| 2,424,095 | 7/47 | Horton | 280—503 X |
| 2,516,067 | 7/50 | Miller | 280—503 |
| 2,854,251 | 9/58 | Able et al. | 280—415 |
| 3,020,567 | 2/62 | Colt | 242—107 X |
| 3,072,419 | 1/63 | Safford | 280—502 X |

PHILIP ARNOLD, *Primary Examiner.*

LEO FRIAGLIA, *Examiner.*